Oct. 25, 1966   B. I. FRIEDMAN ETAL   3,280,568
RADIOISOTOPE ATTITUDE CONTROL ENGINE
Filed April 8, 1963   2 Sheets-Sheet 1
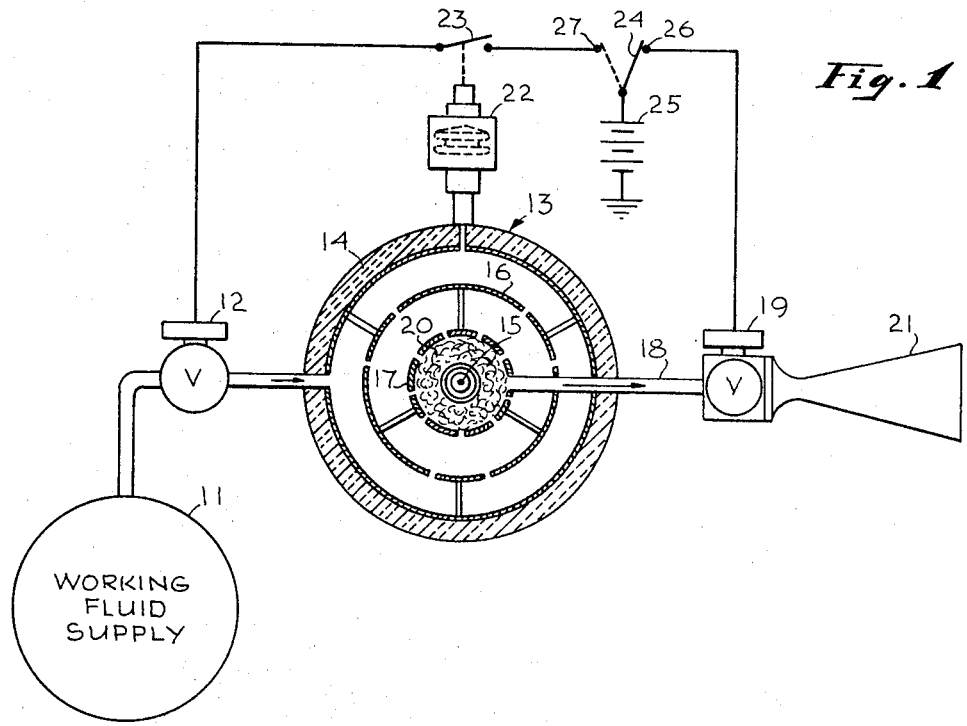
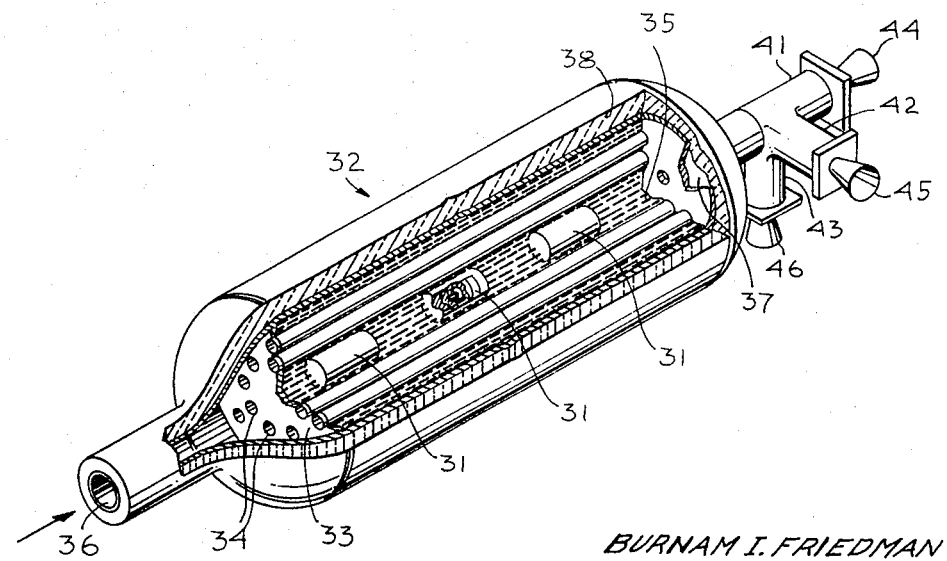
BURNAM I. FRIEDMAN
DONALD JORTNER
JOHN S. MARTINEZ
INVENTORS
BY
E. Hayward Marshall
AGENT Oct. 25, 1966

B. I. FRIEDMAN ETAL 3,280,568

RADIOISOTOPE ATTITUDE CONTROL ENGINE

Filed April 8, 1963

BURNAM I. FRIEDMAN
DONALD JORTNER
JOHN S. MARTINEZ
INVENTORS

BY

E. Hayward Marshall

AGENT

3,280,568
RADIOISOTOPE ATTITUDE CONTROL ENGINE
Burnam I. Friedman, San Pedro, John S. Martinez, Redondo Beach, and Donald Jortner, Palos Verdes Peninsula, Calif., assignors, by mesne assignments, to TRW Inc., Cleveland, Ohio, a corporation of Ohio
Filed Apr. 8, 1963, Ser. No. 271,376
9 Claims. (Cl. 60—266)

This invention relates to a radioisotope attitude control engine and more particularly to a heated gas intermittent thrustor which employs thermal energy storage to accumulate the output of a radioisotope heat source and transfer it into the momentum of a working fluid, which is vaporized and super-heated prior to explusion through a jet nozzle, when required for attitude stabilization or vehicle control for a long life communication satellite or space station, or to power an evasive reconnaissance satellite or other maneuvering space systems, which require modest amounts of impulse periodically over a long period of time. The heat storage feature of the present invention minimizes the quantity of radioisotope required to provide a given thrust level for intermittent operation.

Various other systems have been utilized and proposed for similar application, but these prior systems have various disadvantages. Similar systems which utilize electric heaters for heating a stored fluid have not been successful because of the excessive consumption of electrical power requiring complex, heavy and expensive power supplies on board the space vehicle. Chemical systems which utilize the combustion of various liquid and solid propellants to provide intermittent bursts of thrust are sometimes heavy, and are usually complicated and tend to be unreliable over a long period of time. These chemical systems also have a relatively low specific impulse, so that the required propellant weight for a given total impulse is increased. Some proposed systems using ambient fields, such as gravity gradient or magnetic fields, and stored momentum devices have not proven satisfactory in many instances for the following reasons. Ambient fields can only be used for attitude control in one direction at low altitudes near the earth and the stored momentum systems are complicated mechanically and require heavy fly wheels as well as some means for restoring momentum at periodic intervals for long flights. Another type of heated gas system, which utilizes a solar concentrator for providing heat to vaporize and super-heat the working fluid, is very complicated and heavy.

Briefly stated, one preferred embodiment of the radioisotope attitude control engine of the present invention consists essentially of an encapsulated radioisotope heat source mounted in a heat exchanger, a storage tank for the working fluid, and one or more nozzles, these being interconnected by suitable control valves and fluid lines for intermittent operation of the thrustor as required. The radioisotope is preferably one which emits alpha or weak beta particles, so that the radiation levels are quite low.

In one particular configuration, the radioisotope capsule is situated in the geometric center of an externally insulated heat exchanger provided with a heat sink containing an energy storage substance, such as silicon or lithium hydride, which because of their high heat of fusion are capable of storing large amounts of energy at temperatures near their respective fusion temperatures. The working fluid flows from the storage tank into the heat exchanger and through a number of internal tubes in in the heat sink where the working fluid is vaporized and superheated, and then to the nozzles through which the fluid is expanded to provide thrust. In this type of system a pressure regulator valve and a pressure relief or check valve may be interposed between the propellant tank and the heat exchanger and a flow control valve may be interposed between the heat exchanger and the nozzles. In some instances a passive temperature control may be utilized to maintain a safe operating temperature of the radioisotope capsule and heat sink material during periods of heat storage by dissipating sufficient heat by radiation. However, if necessary, for particular applications, an equilibrium temperature may be maintained by active temperature control, utilizing suitable means for automatically operating one or more windows in the insulated housing surrounding the heat exchanger, thereby exposing a higher temperature inner radiating surface so that sufficient heat is radiated to maintain a safe operating temperature.

In another type of configuration, the energy from the radioisotope capsule is stored directly in a small mass of working fluid which fills an insulated spherical heating tank having a central core of high temperature metallic gauze or other suitable higher thermal conductivity material surrounding the radioisotope to insure a relatively uniform temperature distribution in the central core of hot gas. In this configuration thrust is obtained by releasing some of the hot stored gas from sphere and expelling it through the nozzle. While this configuration is not capable of storing as much heat energy as the heat of fusion configuration, it does appear to be applicable for mission in which high propellant performance together with low total impulse per firing is desired.

In this particular system the working fluid may be pressurized by its own vapor and fed through a regulator feed valve into the heat exchanger, where it is vaporized and super-heated by the heat emission or the radioisotope. When a thrustor control valve between the heat exchanger and the nozzle is opened, the regulator valve between the fluid storage tank and the heat exchanger is automatically closed during the thrusting period.

One object of the present invention is to provide a more efficient and reliable propulsion system with a high specific impulse for maintaining attitude stabilization or similar vehicle control for a long life satellite or space station.

Another object of the present invention is to provide a radioisotope heated gas rocket engine for space vehicle attitude control or maneuvering space systems, which combines inherent high reliability with high system performance in providing modest amounts of impulse periodically over a long period of time.

A further object of the present invention is to provide a hot gas intermittent thrustor utilizing a radioisotope as a source of heat which is stored to supply energy intermittently to a fluid propellant in a highly efficient and predictable manner with a minimum of weight and very few moving parts.

A still further object of the present invention is to provide a radioisotope powered, intermittent thrust rocket which utilizes heat storage during non-thrusting periods to drastically reduce the quantity of radioisotope required to perform a given intermittent thrust mission and results in economy of operation, reduction in weight and cost to build, and also permits the use of alpha sources for many missions which would otherwise require less desirable beta sources.

Other objects and many of the attendant advantages of this invention will be readily appreciated when the same becomes better understood by reference to the following detailed description when considered in connection with the accompanying drawings wherein:

FIG. 1 is a schematic diagram of one preferred embodiment of the radioisotope attitude control engine of the present invention with the heat exchanger shown in section, and wherein the heat energy is stored directly in a small mass of working fluid which fills an insulated spherical heating tank (shown in section) with a central core of metallic gauze around the radioisotope capsule in an inner chamber leading to the nozzles;

FIG. 2 is a pictorial view of another preferred embodiment of the present invention with a portion of the heat exchanger broken away to show the internal construction of a heat exchanger utilizing the heat of fusion energy storage configuration;

Figure 3:
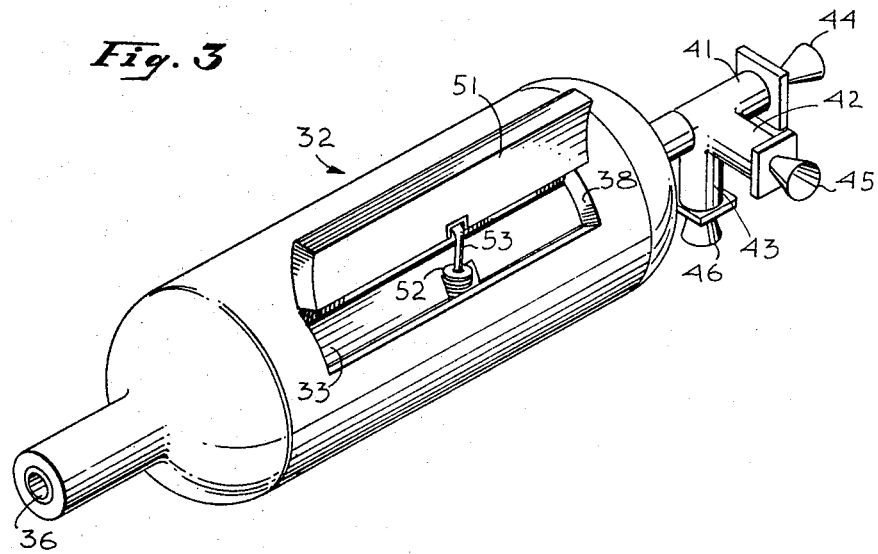
FIG. 3 is a pictorial view illustrating one modification of the heat of fusion type of heat exchanger shown in FIG. 2 wherein one or more thermostatically actuated windows are provided for maintaining a safe operating temperature within the heat exchanger.

Referring now to the drawings in detail, and more particularly to the schematic diagram of FIG. 1, the working fluid or propellant is stored at ambient space temperature in a supply tank 11, which is preferably filled with any suitable volatile liquid, such as liquid hydrogen, ammonia ($NH_3$), or various Freons, which has a low molecular weight and may be pressurized by its own vapor at ambient space temperatures.

The working fluid is introduced through a regulator or feed valve 12 into the heat exchanger or super heater 13 which is preferably spherical in shape and has a spherical outer wall covered with a layer of insulation 14 for retaining the heat generated by the radioisotope capsule 15. The heat exchanger 13 may also be termed a heat sink or heat tank, since it stores the heat generated by the radioisotope heat source in the super-heated working fluid or vapor. In this modification the working fluid also serves as a heat storage material, utilizing the heat of vaporization to absorb and store some of the heat energy emitted by the radioisotope capsule. Additional heat energy is stored by super heating the vapor in heat sink 13.

A plurality of concentric perforated spherical walls 16 and 17 are preferably provided to form a plurality of chambers and cause the fluid to flow in a circuitous path towards the inner chamber containing the radioactive capsule 15 which will obviously be at a higher temperature than the outer passages, so that the working fluid is at a maximum temperature before it passes through the outlet conduit 18 and the thrustor flow control valve 19 to be expelled through the nozzle 21. If desired, a central core of high temperature metallic gauze may be positioned in the inner chamber to insure a uniform temperature distribution in the central core of hot gas.

If desired, however, the heat exchanger 13 in the system illustrated in FIG. 1 may be cylindrical in shape, similar to the heat exchanger illustrated in FIGS. 9 and 10 of the application for a Direct Cycle Radioisotope Rocket Engine, Serial No. 243,140, filed December 7, 1962, by C. L. Dailey, et al., now abandoned.

A pressure actuated mechanism such as the bellows actuator 22 is connected to the interior of the super heater 13 and responds to the pressure in the super heater 13 to open or close a switch 23 for actuating the feed valve 12, which will be closed when the switch 23 is in the position shown.

The switch 24 in the position shown in solid lines in FIG. 1 actuates the thrustor flow control valve 19 to its open position, which permits the super heated vapor from the heat exchanger 13 to be exhausted through the nozzle 21 providing a reaction force for any control function. During thrusting when the control valve 19 is open and the switch 24 is in the position shown, the circuit is open from the battery 25 through the switch 23 to the feed valve 12, so that the super heater feed valve 12 remains in closed position to ensure the liquid does not enter the super heater 13 and saturate the vapor therein. After each thrusting period, the switch 24 is moved from contact 26 to contact 27, thus closing the thrustor control valve 19 and energizing the circuit through switch 23 to the feed valve 12, providing that the switch 23 is in a closed position caused by the fact that the propellant has been exhausted from the super heater 13, and the pressure in the boiler has dropped, the feed valve 12 will be opened to permit additional propellant to enter the boiler, where it will be heated to an equilibrium condition and increase the pressure until the switch 23 is actuated to its open position, thus closing the feed valve 12.

This process will be repeated continually on demand until all of the liquid in the supply tank or storage vessel 11 is depleted and the vapor pressure drops below the super heater pressure. This assures an extremely high propellant utilization without the need for an elaborate feed system. The switch 24 may be actuated by remote control from any attitude control or guidance system (not shown) in the space vehicle. Obviously, any number of nozzles 21 may be connected through additional control valves, such as the one shown at 19, connected to the outlet conduit 18.

It is obviously desirable to operate at the highest practical temperature in order to obtain the maximum efficiency and the highest specific impulse, but the temperature limits will be determined by the materials of which the super heater 13, the valves 12 and 19 and the nozzle 21 are constructed. These elements would be preferably formed of tungsten or other suitable material having a relatively high melting point, well above the maximum temperatures that will be encountered during operation. By proper selection of the radioisotope and insulation of the super heater 13, practically any temperature can be obtained, using passive temperature control where the heat dissipated by radiation at the normal maximum operating temperature will be equal to the heat generated by the radioisotope 15.

If desired, the central chamber of the heat exchanger 13 within the spherical wall 17 may contain a core of high temperature metallic gauze 20 which insures a relatively uniform temperature distribution in the central core of hot gas.

One modification of the present invention is shown in FIG. 2 utilizing the heat of fusion of some suitable material such as silicon or lithium hydride for storing the heat produced by the radioisotope during periods when thrust is not required. These materials by virtue of their high heat of fusion are capable of storing large amounts of energy at their respective fusion temperatures without increasing the external temperature and thus limiting the amount of heat radiated during the storage period. Equilibrium temperatures can be controlled by active or passive methods.

As shown in FIG. 2 the radioisotope capsules 31 are preferably situated in the geometric center of the heat exchanger or heat sink 32. These capsules 31 may be mounted inside of a cylindrical housing or can 33, which has a number of internal tubes 34 extending axially therethrough. The housing 33 contains the heat storage material 35, such as silicon or lithium hydride.

The working fluid which is stored as a liquid in the supply tank (not shown) enters the heat exchanger 32 through the fluid conduit 36 and passes through the plurality of internal tubes 34 parallel to the axis of the cylinder, where the fluid is vaporized and super heated before it is discharged to a plenum chamber 37 at the opposite end of the heat exchanger 32.

On demand any one or more of the thrustor control valves 41, 42 and 43 may be opened to permit the working fluid to flow through one or more of the nozzles 44, 45 and 46, to provide thrust in the desired direction. For a single axis thrust system only one nozzle is required, hence no hot gas valve is needed because the flow can be controlled adequately by a single valve in the fluid conduit 36.

During thrusting with the working fluid passing through the tubes 34 and plenum chamber 37 to one or more of the nozzles 44, 45 and 46, the heat storage material 35 will gradually solidify as the heat of fusion is absorbed to super heat the working fluid. After termination of a thrusting period the heat generated by the radioisotope capsules 31 will be transferred into the heat storage material 35 until it is completely liquidized, and then the heat storage material will start increasing in temperature until an equilibrium temperature is reached, depending on the amount of heat generated by the radioisotope, the thickness of the insulation 38 and the amount of heat radiated from the external surface of the heat exchanger.

For some applications a passive system of this type may be satisfactory, but if it is desirable to maintain a steady state internal temperature only slightly above the heat sink melting point during the recharging period, then the great majority of the heat generated should go into energy storage rather than rejection to space. Therefore, it may be desirable to provide some simple form of active temperature control which would be capable of producing high heat storage efficiency without excessive insulation weight. Thus the maximum temperature within the heat exchanger could be maintained close to the melting point of the heat storage material 35.

One form of active temperature control is illustrated in FIG. 3, wherein a window with a closure 51 is provided in the outer layer of insulation 38. The closure 51, which may be formed of the same insulating material, is actuated by a bellows 52 through a push rod 53 pivotally connected to the lower edge of the window 51.

The closure 51 is thermostatically operated by the bellows 52, when a temperature is reached slightly above the melting point of the heat storage material 35 to open the closure 51 thereby exposing the higher temperature surface of the cylindrical housing or container 33 which radiates the additional heat generated by the radioisotope capsules 31.

Figure 4:
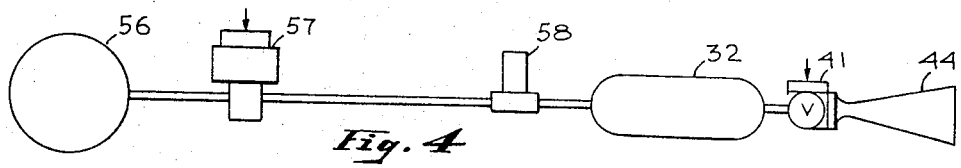
FIG. 4 is a schematic diagram illustrating one particular arrangement of the valves and connecting lines for a radioisotope attitude control engine.
Figure 5:
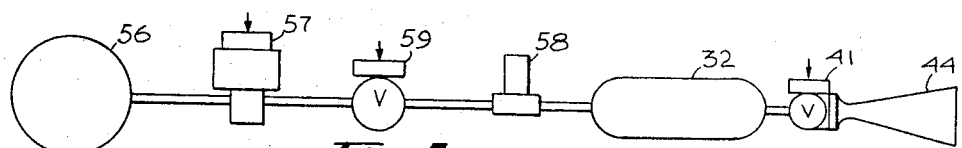
FIG. 5 is a schematic diagram illustrating one variation of the control valve arrangement of FIG. 4.
Figure 6:
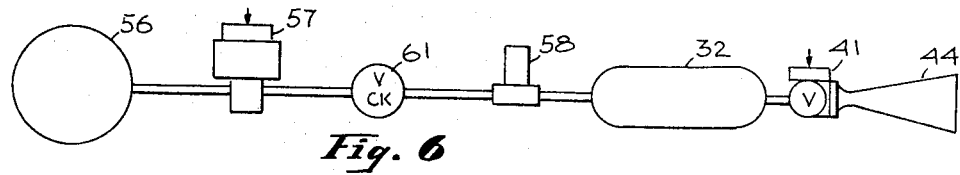
FIG. 6 is a still further modification of the control valve arrangements of FIGS. 4 and 5.

FIGS. 4, 5 and 6 illustrate three variations of possible system configurations which may be utilized with the heat exchangers illustrated in FIGS. 2 and 3.

In each of these systems the heat exchanger 32 is shown schematically as connected through one of the thrustor flow control valves 41 to one of the nozzles 44 to allow the hot gas to enter the expansion nozzle whenever thrust is desired. It is desirable that this control valve 41 have a very fast response, reliable operation, long life cycle, compatibility with high temperatures, very low leakage and light weight.

The thrustor flow control valves 41 may be remotely controlled by any suitable control system either manned or automatic.

The working fluid such as hydrogen or ammonia is stored in liquid form under pressure in the propellant supply tank 56 under relatively high pressure. The pressure regulator valve 57 provides the heat exchanger 32 with constant pressure gas during propellant flow to replace the gas exhausted from the heat exchanger 32 during thrusting. This regulator valve 57 should be fast acting, well damped, light weight and unaffected by variations in temperature.

At the end of the thrusting period, when the flow control valve 41 is cut off, the gases remaining in the heat exchanger 32 will be heated to a higher temperature and will thus increase the pressure in the heat exchanger 32. The pressure relief valve 58 is provided to vent the gases necessary to maintain the gas pressure at the proper level. This relief valve 58 should be compatible with the temperature environment, have a narrow range over which it will relieve pressure, be light weight, and should produce no net thrust during venting.

If the pressure regulator valve 57 is located too close to the heat exchanger 32, heat soak will cause the liquid behind the regulator valve 57 to get hot, thus making it difficult to control the vapor pressure in the supply tank 56. On the other hand, if the regulator valve 57 is too far from the heating cavity, its quick reaction will be nullified by the distance the fluid must travel before it is vaporized. Furthermore, a large amount of liquid would be trapped between the pressure regulator valve 57 and the shut-off valve 41, and this liquid would eventually vaporize and increase the pressure to cause the pressure relief valve 58 to dump uselessly. This propellant wastage can be avoided by placing either a shut-off valve 59 or a check valve 61 between the pressure regulator valve 57 and the heat exchanger 32, an indicated in FIGS. 5 and 6 respectively. Either approach will keep the hot gas away from the pressure regulator valve 57, and will reduce the problem of heat soak.

The shut-off valve 59 could also be utilized during long periods when no thrust is necessary in order to decrease the possibility of propellant losses through the pressure relief valve 58. A thrustor having only one nozzle can often operate satisfactorily without the hot gas shut-off valve 41, providing the lower temperature valve 59 is inserted in the fluid conduit upstream of the heat exchanger 32.

The choice of a working fluid, type of radioisotope, radioistope power level, and heat storage material depends upon the specific application and mission of the space vehicle or system.

The choice of a working fluid, for a particular mission, depends upon the storage time required and the overall system design. For shorter missions, hydrogen, which has the lowest molecular weight would be one of the best working fluids, but for longer missions which require storage over a longer period of time, ammonia, which has a relatively low molecular weight when dissociated into nitrogen and hydrogen, has advantages, since it is storable over a longer period of time and does not require insulation to prevent boil off or excessive pressures during the longer missions. However, other working fluids such as helium, Freons and other low molecular weight storables may be used.

The choice of radioisotope also depends upon the particular application and mission. Alpha emitting radioisotope heat sources such as plutonium 238, curium 242, curium 244 and polonium 210 have lower radiation levels which simplify ground handling, reduce or eliminate the necessity for radiation shielding of the payload and can be used with manned systems. However, the alpha emitters are high in cost and are not readily available in large quantities. Some weak beta emitting radioisotope heat sources such as strontium 90 and cerium 144 may be used where the higher radiation is not a disadvantage. But because the heat storage system permits intermittent thrust missions to be performed with considerably smaller quantities of radioisotope than that required in the absence of the heat storage system it is possible with this invention to employ the more desirable alpha emitters for missions which previously required beta emitting radioisotopes.

The choice of a heat storage or heat sink material also depends on a number of different factors. The heat of fusion of lithium hydride is approximately twice that of silicon, which would reduce the weight of the heat exchanger, on the other hand the higher melting point or fusion temperature of silicon would provide a higher working fluid gas temperature and therefore higher specific impulse. However, the use of silicon would probably require a protective coating on any metallic surfaces or the use of a ceramic material for the heat exchanger, since silicon reacts at high temperatures with most metals. Furthermore, silicon has a much higher melting point, which would limit the materials which could be used in the heat exchanger. On the other hand lithium hydride, because of its lower fusion temperature, is compatible with most materials which would be used in the heat exchanger, but would provide a lower specific impulse. Other more advanced heat storage techniques could be employed for this purpose, when they are developed.

Obviously, many other modifications and variations of the present invention may be made within the scope of the following claims.

What is claimed is:

1. A heated gas intermittent thrustor comprising:
   A. means for storing a propellant fluid;
   B. a radioisotope capsule;
   C. heat exchanger means surrounding said capsule for storing the heat emission therefrom,
      said heat exchanger means having passages therethrough and an inlet connected to said propellant storing means and a controllable outlet; said passages discharging through said outlet only;
   D. at least one nozzle connected to said outlet; and
   E. means for alternately opening and closing said controllable outlet thereby intermittently expelling heated propellant through said nozzle and storing heat in said heat exchanger.

2. A heated gas intermittent thrustor comprising:
   A. means for storing a propellant fluid;
   B. a radioisotope capsule;
   C. heat exchanger means surrounding said capsule for storing the heat emission therefrom,
      said heat exchanger means having passages therethrough and an inlet connected to said propellant storing means and a controllable outlet; said passages discharging through said outlet only;
   D. at least one nozzle connected to said outlet;
   E. said heat exchanger being constructed to hold a heat storage material in heat transfer relation to said radioisotope capsule over a period of time to store the heat energy emitted therefrom, and means for intermittently opening and closing said controllable outlet thereby intermittently expelling heated propellant through said nozzle and storing heat in said heat exchanger.

3. A heated gas intermittent thrustor comprising:
   A. means for storing a propellant fluid;
   B. a radioisotope capsule;
   C. heat exchanger means surrounding said capsule for storing the heat emission therefrom,
      said heat exchanger means having passages therethrough and an inlet connected to said propellant storing means and an outlet; said passages discharging through said outlet only;
   D. at least one nozzle connected to said outlet;
   E. regulator valve means interposed between said propellant supply means and said heat exchanger inlet; and
   F. intermittently opened and closed flow control valve means interposed between said heat exchanger outlet and said nozzle for intermittently expelling heated propellant.

4. A heated gas intermittent thrustor comprising:
   A. means for storing a propellant fluid;
   B. a radioisotope capsule;
   C. heat exchanger means surrounding said capsule for storing the heat emission therefrom,
      said heat exchanger means having passages therethrough and an inlet connected to said propellant storing means and an outlet; said passages discharging through said outlet only;
   D. at least one nozzle connected to said outlet;
   E. regulator valve means interposed between said propellant supply means and said heat exchanger inlet;
   F. flow control valve means interposed between said heat exchanger outlet and said nozzle; and
   G. means including said regulator and flow control valve means for intermittently expelling heated propellant through said nozzle and storing heat in said heat exchanger.

5. A heated gas intermittent thrustor comprising:
   A. means for storing a propellant fluid;
   B. a radioisotope capsule;
   C. heat exchanger means surrounding said capsule for storing the heat emission therefrom,
      said heat exchanger means having passages therethrough and an inlet connected to said propellant storing means and an outlet; said passages discharging through said outlet only;
   D. at least one nozzle connected to said outlet;
   E. regulator valve means interposed between said propellant supply means and said heat exchanger inlet;
   F. flow control valve means interposed between said heat exchanger outlet and said nozzle;
   G. said heat exchanger being constructed to hold a heat storage material in heat transfer relation to said radioisotope capsule over a period of time to store the heat energy emitted therefrom, and means for intermittently opening and closing said flow control valve means thereby intermittently expelling heated propellant through said nozzle and storing heat in said heat exchanger.

6. A heated gas intermittent thrustor comprising:
   A. means for storing a propellant fluid;
   B. a radioisotope capsule;
   C. heat exchanger means surrounding said capsule for storing the heat emission therefrom,
      said heat exchanger means having passages therethrough and an inlet connected to said propellant storing means and an outlet;
   D. at least one nozzle connected to said outlet;
   E. regulator valve means interposed between said propellant supply means and said heat exchanger inlet; and means for intermittently opening and closing said regulator valve means, thereby intermittently expelling heated propellant through said nozzle and storing heat in said heat exchanger;
   F. said heat exchanger including a heat storage material having a high heat of fusion, said heat storage material being liquified during heat storage periods and solidified during thrusting periods when said propellant flows therethrough.

7. A heated gas intermittent thrustor comprising:
   A. means for storing a propellant fluid;
   B. a radioisopote capsule;
   C. heat exchanger means surrounding said capsule for storing the heat emission therefrom,
      said heat exchanger means having passages therethrough and an inlet connected to said propellant storing means and an outlet;
   D. at least one nozzle connected to said outlet;
   E. regulator valve means interposed between said propellant supply means and said heat exchanger inlet; and means for intermittently opening and closing said regulator valve means, thereby intermittently expelling heated propellant through said nozzle and storing heat in said heat exchanger;
   F. said heat exchanger including a heat storage material having a high heat of fusion, said heat storage material being liquified during heat storage periods and solidified during thrusting periods when said propellant flows therethrough, said heat storage material being selected from the group consisting of lithium hydride and silicon.

8. A heated gas intermittent thrustor comprising:
   A. means for storing a propellant fluid;
   B. a radioisotope capsule;
   C. heat exchanger means surrounding said capsule for storing the heat emission therefrom,
      said heat exchanger means having passages therethrough and an inlet connected to said propellant storing means and an outlet, insulation covering at least a portion of said heat exchanger;
D. at least one nozzle connected to said outlet;
E. regulator valve means interposed between said propellant supply means and said heat exchanger inlet;
F. thermostatically actuated means for increasing the heat radiated by said heat exchanger; and means intermittently opening and closing said regulator valve means, thereby intermittently expelling heated propellant through said nozzle and storing heat in said heat exchanger;
G. said heat exchanger including a heat storage material having a high heat of fusion adapted to liquify during heat storage periods and solidify during thrusting periods when said propellant flows therethrough.

9. A heated gas intermittent thrustor comprising:
A. means for storing a propellant fluid;
B. a radioisotope capsule;
C. heat exchanger means surrounding said capsule for storing the heat emission therefrom, said heat exchanger means having passages therethrough and an inlet connected to said propellant storing means and an outlet, insulation covering at least a portion of said heat exchanger;
D. at least one nozzle connected to said outlet;
E. regulator valve means interposed between said propellant supply means and said heat exchanger inlet;
F. thermostatically actuated means for increasing the heat radiated by said heat exchanger; and means for intermittently opening and closing said regulator valve means, thereby intermittently expelling heated propellant through said nozzle and storing heat in said heat exchanger;
G. said heat exchanger including a heat storage material having a high heat of fusion adapted to liquify during heat storage periods and solidify during thrusting periods when said propellant flows therethrough, said heat storage material being selected from the group consisting of lithium hydride and silicon.

References Cited by the Examiner
UNITED STATES PATENTS

| | | |
|---|---|---|
| 2,765,414 | 10/1956 | Gendler et al. |
| 3,087,451 | 4/1963 | Chandler _____ 60—35.5 X |
| 3,108,054 | 10/1963 | Blackman _____ 60—35.5 |
| 3,150,054 | 9/1964 | Fox _____ 60—35.5 X |

FOREIGN PATENTS

| | | |
|---|---|---|
| 598,774 | 2/1948 | Great Britain. |

OTHER REFERENCES

Missiles and Rockets, Mar. 21, 1960, pages 18–30.

"Nuclear Rocket Propulsion" by R. W. Bussard and R. D. DeLauer, 1958, McGraw-Hill Book Co., Inc., New York, p. 317.

"Nuclear Rockets" by Jerry Grey, Nucleonics Magazine, July 1958, pp. 62–65.

MARK NEWMAN, *Primary Examiner.*

SAMUEL FEINBERG, SAMUEL, LEVINE,
*Examiners.*

G. L. PETERSON, C. R. CROYLE, D. HART,
*Assistant Examiners.*